United States Patent
Fieldman et al.

(10) Patent No.: US 10,391,753 B2
(45) Date of Patent: Aug. 27, 2019

(54) METHODS AND KEYWAY SUPPORTS FOR ADDITIVE MANUFACTURING

(71) Applicant: GENERAL ELECTRIC COMPANY, Schenectady, NY (US)

(72) Inventors: Zachary David Fieldman, Cincinnati, OH (US); Daniel Joerger, Cincinnati, OH (US); Neal Dunham, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 444 days.

(21) Appl. No.: 15/042,010

(22) Filed: Feb. 11, 2016

(65) Prior Publication Data

US 2017/0232672 A1 Aug. 17, 2017

(51) Int. Cl.
| | | |
|---|---|---|
| *B29C 64/153* | (2017.01) | |
| *B29C 64/40* | (2017.01) | |
| *B33Y 10/00* | (2015.01) | |
| *B22F 3/105* | (2006.01) | |
| *B33Y 40/00* | (2015.01) | |

(52) U.S. Cl.
CPC ............ *B33Y 10/00* (2014.12); *B22F 3/1055* (2013.01); *B29C 64/40* (2017.08); *B33Y 40/00* (2014.12); *B22F 2003/1058* (2013.01); *B22F 2998/10* (2013.01); *B22F 2999/00* (2013.01); *B29C 64/153* (2017.08); *Y02P 10/295* (2015.11)

(58) Field of Classification Search
CPC .................. B29C 64/40; B29C 64/153; B22F 2003/1058; B22F 3/1055; B33Y 40/00
See application file for complete search history.

(56) References Cited

U.S. PATENT DOCUMENTS

| | | | |
|---|---|---|---|
| 4,863,538 | A | 9/1989 | Deckard |
| 5,460,758 | A | 10/1995 | Langer et al. |
| 5,529,471 | A | 6/1996 | Khoshevis |
| 5,656,230 | A | 8/1997 | Khoshevis |
| 5,837,960 | A | 11/1998 | Lewis et al. |
| 5,897,825 | A | 4/1999 | Fruth et al. |

(Continued)

FOREIGN PATENT DOCUMENTS

| | | |
|---|---|---|
| EP | 2570595 A1 | 3/2013 |
| GB | 2 479 616 A | 10/2011 |

(Continued)

OTHER PUBLICATIONS

Extended European Search Report and Opinion issued in connection with corresponding EP Application No. 17155568.3 dated Jul. 3, 2017.

(Continued)

*Primary Examiner* — Janis L Dote

(74) *Attorney, Agent, or Firm* — Dority & Manning, P.A.

(57) ABSTRACT

The present disclosure generally relates to methods for additive manufacturing (AM) that utilize support structure in the process of building objects that may be removed by rotating the support structure to a second orientation before removal, as well as novel support structures to be used within these AM processes. The support structures are fabricated in a first orientation and then rotated to the second orientation. The support structures are removed by passing through an outlet of the object.

20 Claims, 6 Drawing Sheets

(56) References Cited

U.S. PATENT DOCUMENTS

| | | | |
|---|---|---|---|
| 6,042,774 A * | 3/2000 | Wilkening | B23K 26/34 264/460 |
| 6,471,800 B2 | 10/2002 | Jang et al. | |
| 6,995,334 B1 | 2/2006 | Kovacevic et al. | |
| 7,381,921 B2 | 6/2008 | Hagemeister et al. | |
| 7,435,072 B2 | 10/2008 | Collins et al. | |
| 8,470,234 B2 | 6/2013 | Clark | |
| 8,506,836 B2 | 8/2013 | Szuromi et al. | |
| 8,684,069 B2 | 4/2014 | Mottin et al. | |
| 9,188,341 B2 | 11/2015 | McMasters et al. | |
| 2002/0062909 A1 | 5/2002 | Jang et al. | |
| 2013/0071562 A1 | 3/2013 | Szuromi et al. | |
| 2013/0307193 A1 | 11/2013 | Johnson et al. | |
| 2013/0316084 A1 | 11/2013 | Szuromi et al. | |
| 2014/0251481 A1 | 9/2014 | Kroll et al. | |
| 2014/0335313 A1 | 11/2014 | Chou et al. | |
| 2015/0021379 A1 | 1/2015 | Albrecht et al. | |
| 2017/0232511 A1 | 8/2017 | Fieldman et al. | |
| 2017/0232512 A1 | 8/2017 | Joerger | |
| 2017/0232670 A1 | 8/2017 | Joerger et al. | |
| 2017/0232671 A1 | 8/2017 | Fieldman | |
| 2017/0232682 A1 | 8/2017 | Alcantara Marte et al. | |
| 2017/0232683 A1 | 8/2017 | Alcantara Marte et al. | |

FOREIGN PATENT DOCUMENTS

| | | |
|---|---|---|
| JP | H09-216290 A | 8/1997 |
| WO | WO 2014/071135 A1 | 5/2014 |
| WO | 2015/019070 A1 | 2/2015 |

OTHER PUBLICATIONS

Notification of Reasons for Refusal issued in connection with corresponding JP Application No. 2017-011741 dated May 15, 2018.

First Office Action and search issued in connection with corresponding CN Application No. 201710073907.4 dated Jul. 16, 2018.

* cited by examiner

METHODS AND KEYWAY SUPPORTS FOR ADDITIVE MANUFACTURING

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material in the direction 138. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of access powder by, for example, blowing or vacuuming. Other post processing procedures include a stress release process. Additionally, thermal and chemical post processing procedures can be used to finish the part 122.

The present inventors have discovered that the additive manufacturing process described above may present difficulties for objects having complex shapes. In particular, the fabrication of internal surfaces may benefit from lateral supports to prevent damage to the surface from lateral forces (e.g., generated by the recoater 116). However, it may be difficult to remove supports from such internal surfaces.

In view of the above, it can be appreciated that there are problems, shortcomings or disadvantages associated with AM techniques, and that it would be desirable if improved methods of supporting objects and support structures were available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The present disclosure generally relates to methods for additive manufacturing (AM) that utilize support structure in the process of building objects that may be removed by manipulating the support structure to a second orientation before removal, as well as novel support structures to be used within these AM processes. A method for fabricating an object includes irradiating a layer of powder in a powder bed to form a fused region; providing a subsequent layer of powder over the powder bed by passing a recoater arm over the powder bed from a first side of the powder bed; and repeating the irradiating and providing until the object and at least one support structure is formed in the powder bed. The support structure and the object have a first orientation, and the object comprises an outlet. The method further includes rotating the support structure to a second orientation and removing the support structure by passing the manipulated support structure through the outlet of the object.

These and other aspects of the invention will become more fully understood upon a review of the detailed description, which follows.

DETAILED DESCRIPTION

Figure 1:
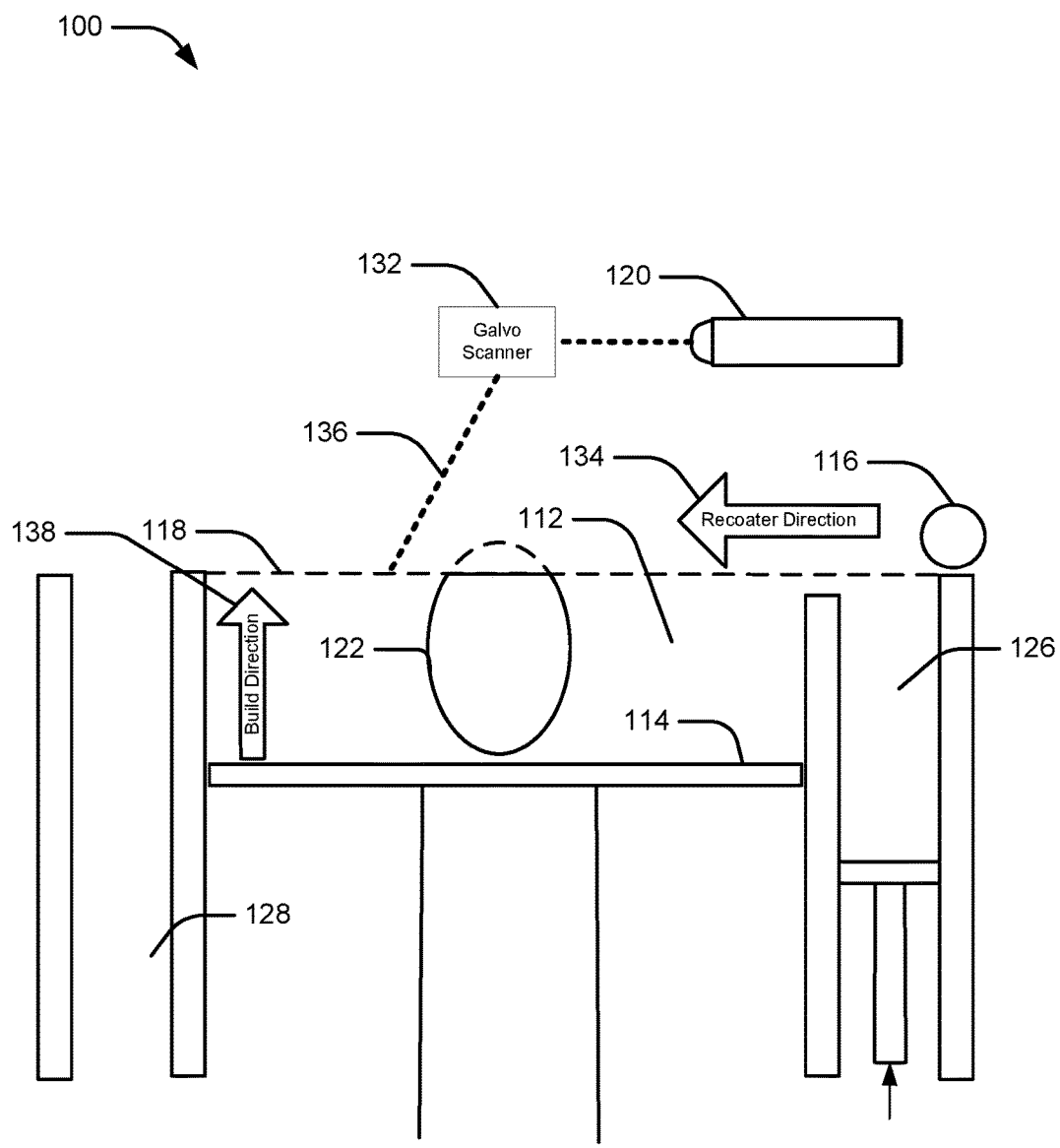
FIG. 1 is schematic diagram showing a cross-sectional view of an example apparatus for additive manufacturing in accordance with aspects of the present invention.
Figure 2:
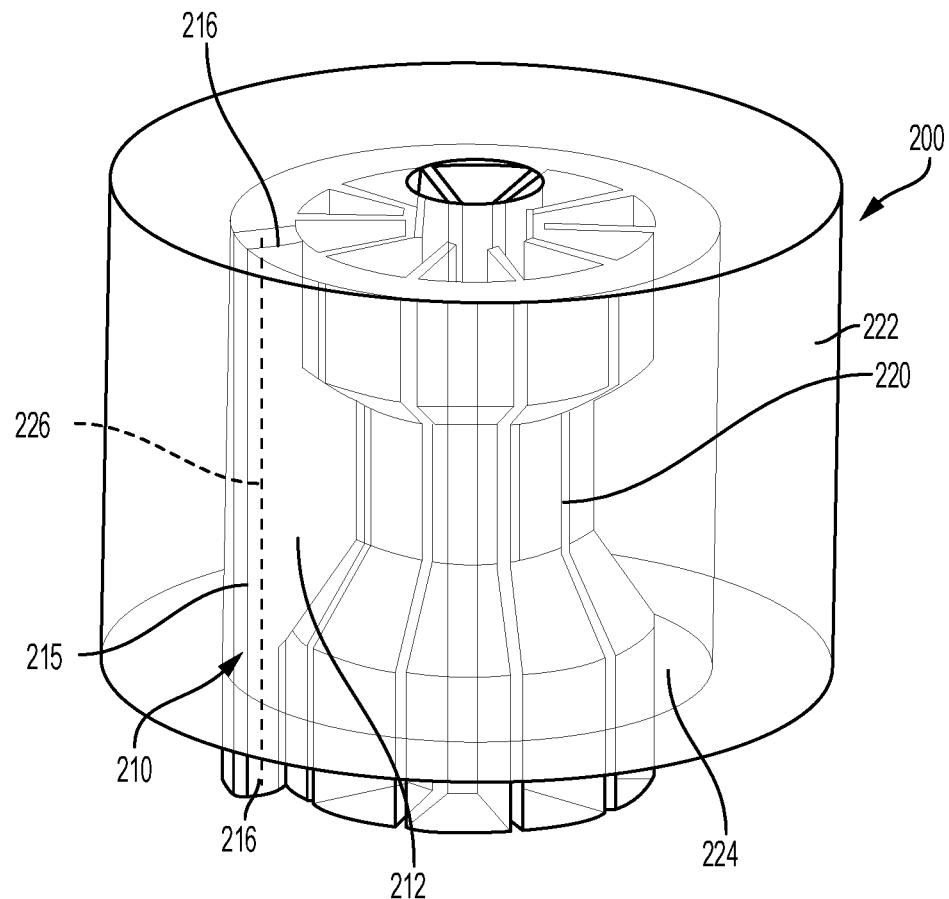
FIG. 2 illustrates a perspective view of an example object and example support structure in accordance with aspects of the present invention.
Figure 3:
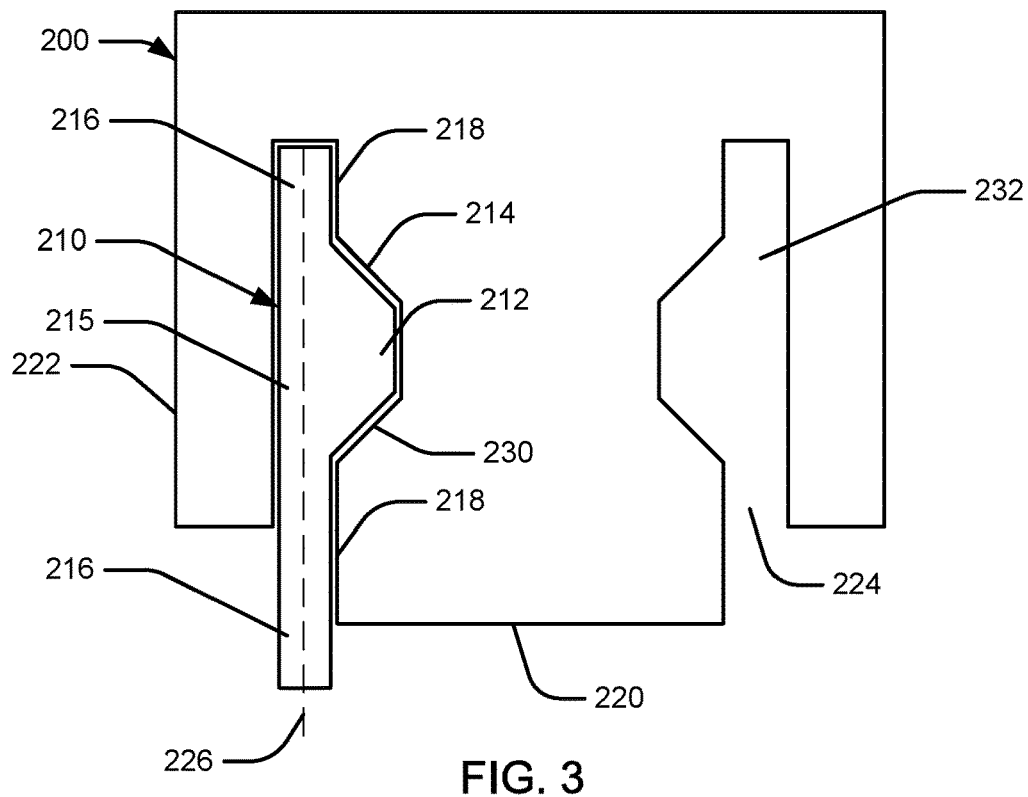
FIG. 3 illustrates a simplified cross-sectional view of the example object and example support structure of FIG. 2.
Figure 4:
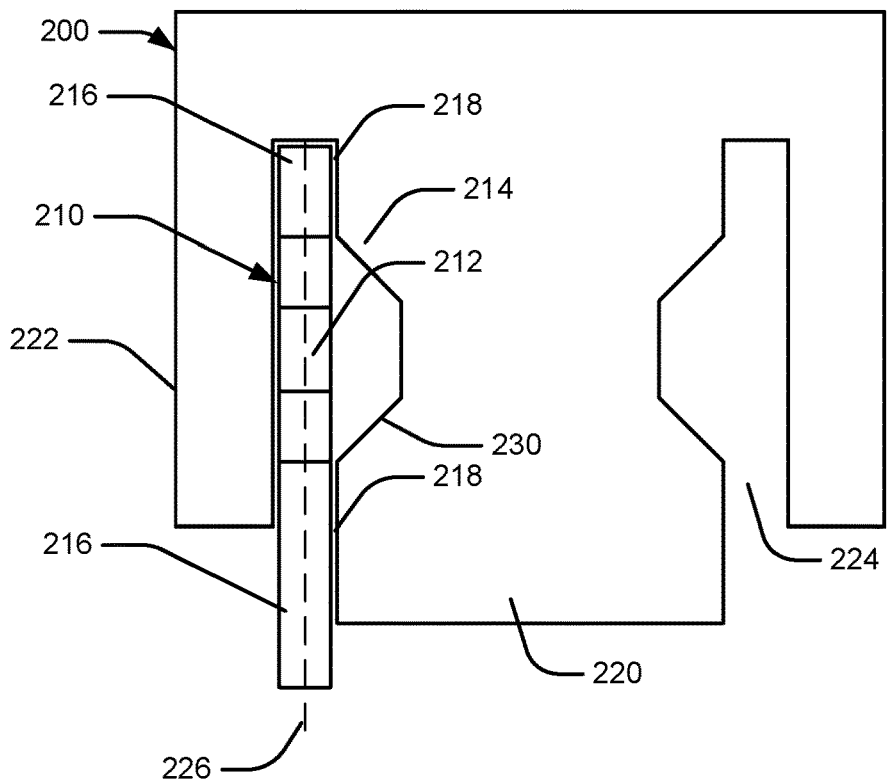
FIG. 4 illustrates a simplified cross-sectional view of the example object and example support structure of FIG. 2 in a second orientation.
Figure 5:
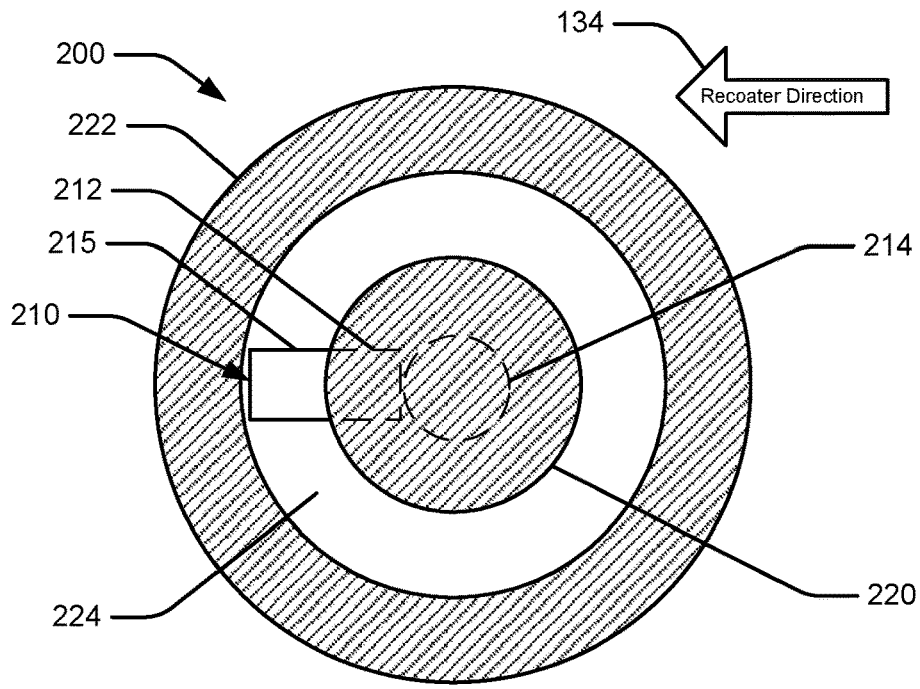
FIG. 5 illustrates a bottom view of the example object and example support structure of FIG. 2.
Figure 6:
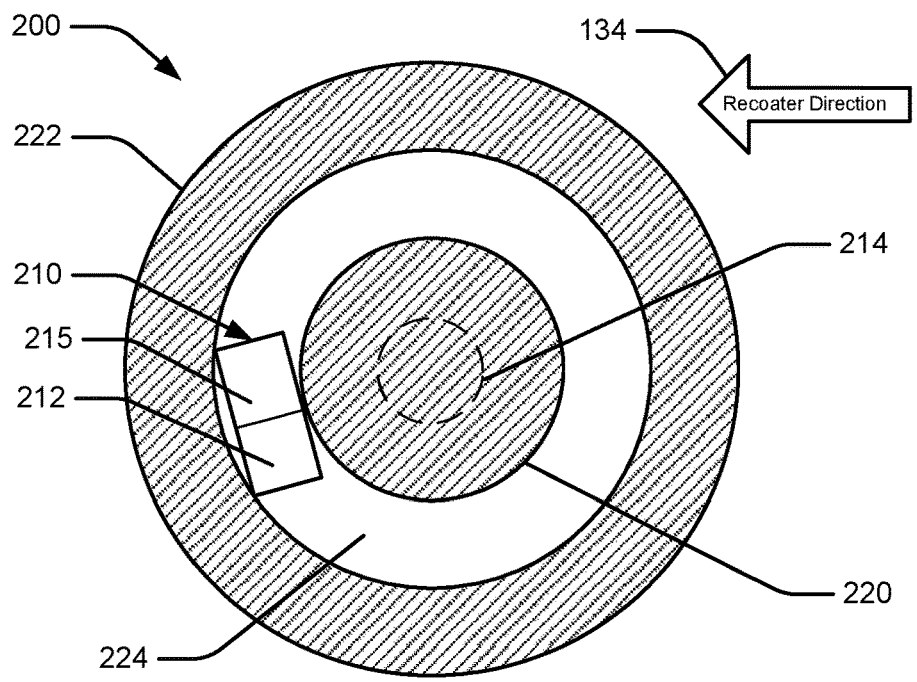
FIG. 6 illustrates a bottom view of the example object and example support structure of FIG. 2 in a second orientation.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts FIG. 2 illustrates and an example support structure 210 supporting an internal portion of an object 200. FIG. 3 illustrates a simplified vertical cross-sectional view of FIG. 2. FIG. 4 illustrates a simplified vertical cross-sectional view of FIG. 2 after the support structure 210 has been rotated to a second orientation. FIG. 5 illustrates a bottom view of FIG. 2. FIG. 6 illustrates a bottom view of FIG. 2 after the support structure 210 has been rotated to a second orientation. The support structure 210 and the object 200 may be manufactured according to an AM process. For example, the apparatus 100 of FIG. 1 and method described above may be used. In this type of AM process, the object 200 is built layer-by-layer by selectively sintering or melting areas of the powder in the regions that form the object 200. The support structure 210 is built simultaneously with the object 200 by melting or sintering additional regions of the powder in the location of the support structure 210.

Upon completion of the AM process, the support structure 210 is removed from the object 200. In one aspect, the support structure 210 is attached along with the object to the build plate and may be detached from the build plate and discarded. The support structure 210 may alternatively be formed without attachment to the build plate as a free standing object within the powder bed. In addition, the support structure may include a point of attachment to the object 200 that may be readily broken away once the AM process is complete. This may be accomplished by providing a breakaway structure-a small tab of metal joining the object 200 and support structure 210. The breakaway structure may also resemble a perforation with several portions of metal joining the object 200 and support structure 210.

The removal of the support structure 210 from the object 200 may take place immediately upon, or during, removal of the object from the powder bed. Alternatively, the support structure may be removed after any one of the post-treatment steps. For example, the object 200 and support structure 210 may be subjected to a post-anneal treatment and/or chemical treatment and then subsequently removed from the object 200 and/or build plate.

The present inventors have found that certain objects may benefit from a support structure 210 that that includes one or more projections conforming to a divergent surface of the object. Such divergent surfaces may benefit from lateral support as the object is built. The projections of the support structure, however, may prevent the support structure from being directly removed from the object.

In the example aspect illustrated in FIGS. 2-5, the support structure 210 has an elongated shape with a projection 212. The object 200 includes a corresponding recessed portion 214, best seen in FIG. 3. As illustrated in FIG. 2, upon forming the support structure 210 together with the object 200, the projection 212 is congruent with the recessed portion 214 including a divergent surface 230. In other words, the projection 212 has an edge that corresponds to a surface of the recessed portion 214. In an aspect, the support structure 210 is a non-contact support separated from the object 200 by a thin layer of powder. In another aspect, the support structure 210 has one or more contact surfaces that contact the object 200. The support structure 210 further includes a spine 215 that extends between leg portions 216. The leg portions 216 are adjacent non-recessed portions 218 of the object 200.

In another aspect, the object 200 includes an inner structure 220 and an outer structure 222. The inner structure 220 includes the recessed portion 214 and the non-recessed portion 218. The outer structure 222 surrounds the inner structure 220 and may be in the form of a cylinder, for example. The outer structure 222 is spaced from the inner structure 220, thus defining a cavity 232 having an outlet 224. For example, the cavity 232 is generally cylindrical. As best seen in FIG. 5, the outlet 224 is a ring shaped opening between the inner structure 220 and the outer structure 222. In an aspect, the support structure 210 fills a portion of the cavity to provide support for the object 200 as the object 200 is being built. For example, as best seen in FIG. 5, the support structure 210 is formed in a first orientation having a long dimension in a direction parallel to the recoater direction 134 to provide lateral support to the object 200.

As illustrated in FIG. 2, the leg portion 216 of the support structure 210 extends through the outlet 224. However, due to the geometry of the support structure 210 and geometry of the object 200, and more particularly due to the projection 212 extending into the recessed portion 214 and the outer structure 222 being adjacent the spine 215 of the support structure 210, it is not possible to remove the support structure 210 directly downwardly through the opening 224 in the illustrated orientation. For example, if one were to attempt to pull support structure 210 downwardly through the opening 224 without rotating it, the projection 212 would contact a divergent surface 230 of the recessed portion 214 and prevent the downward movement. As illustrated in FIG. 5, the projection 212 is blocked by the inner structure 220 in the first orientation. However, by manipulating the support structure 210 to orientation shown in FIGS. 4 and 6, the spine 215 and projection 212 are aligned with the outlet 224. For example, manipulating the support structure 210 may include rotating the support structure 210 approximately 90 degrees about a longitudinal axis 226. In an aspect, where the opening is ring shaped, the angle of rotation depends on the width of the support structure 210 and the diameter of the ring, but the angle of rotation may generally be less than 90 degrees, for example, between 75 degrees and 90 degrees. For example, as illustrated in FIG. 6, the support structure 210 may be rotated such that a long side of the projection 212 forms a chord between two points on the inner surface of the outer structure 222. Moreover, manipulating the support structure 210 may additionally or alternatively include translating the support structure (e.g., sliding the support structure 210 horizontally before removal. Thus, the operator can then remove the support structure 210 through the outlet 224 after manipulating the support structure 210 to a second orientation.

Figure 7:
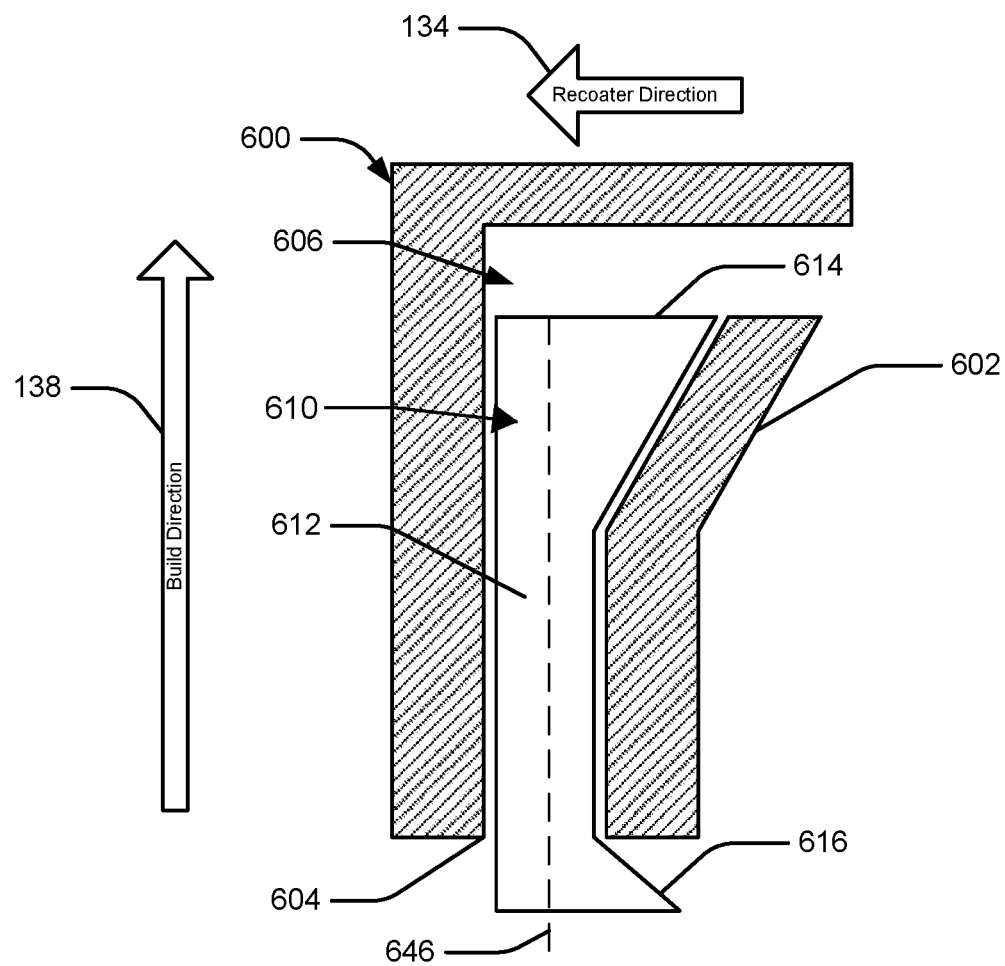
FIG. 7 illustrates a side schematic view of an example object and example support structure in accordance with aspects of the present invention.
Figure 8:
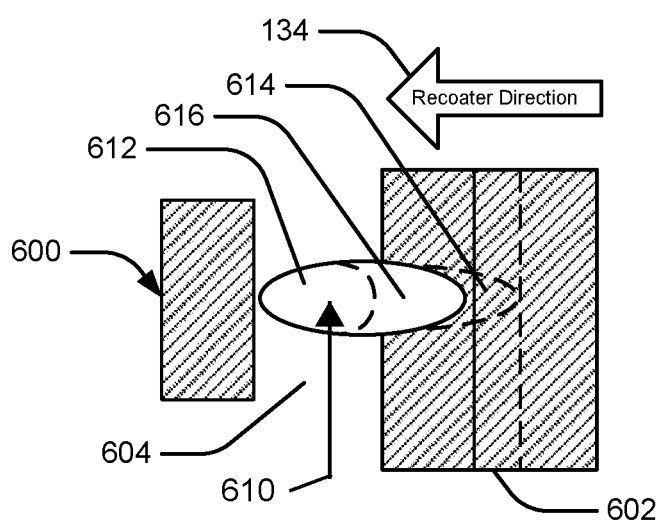
FIG. 8 illustrates a bottom view of the example object and example support structure of FIG. 7.
Figure 9:
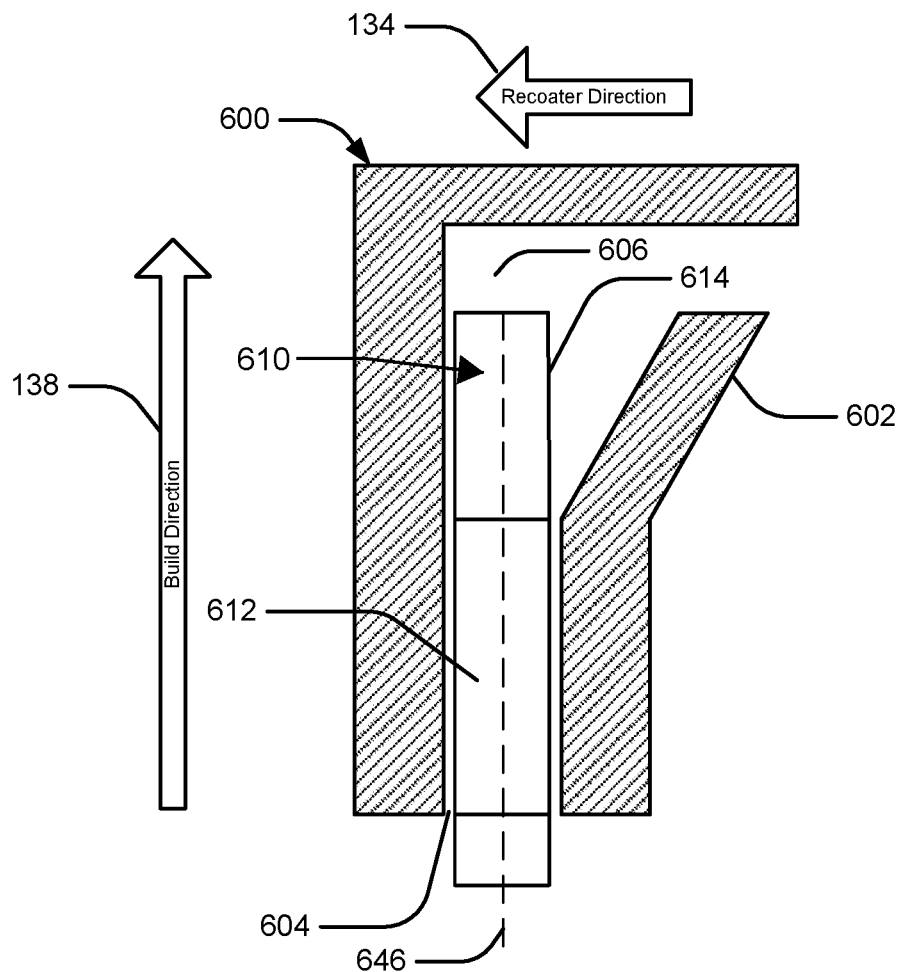
FIG. 9 illustrates a side schematic view of the example object and example support structure of FIG. 7 in a second orientation.
Figure 10:
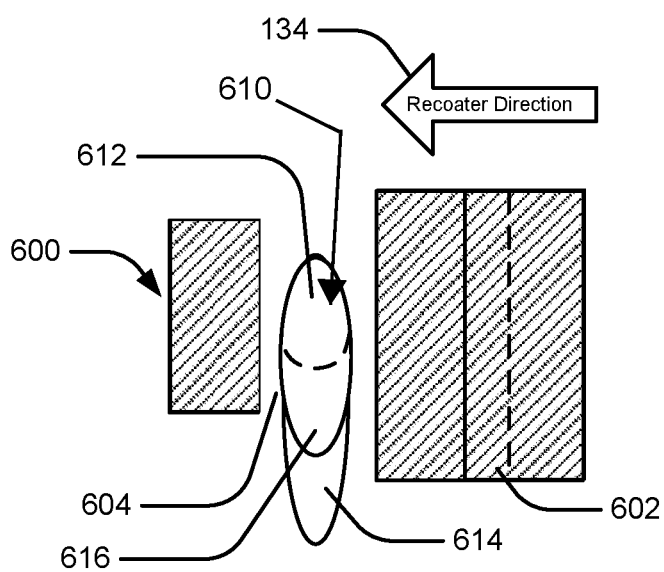
FIG. 10 illustrates a bottom view of the example object and example support structure of FIG. 7 in the second orientation.

FIGS. 7-10 illustrate another embodiment of an object 600 and support structure 610, where the support structure 610 is only removable after rotating the support structure 610. FIG. 7 is a vertical cross-sectional view of the object 600 and support structure 610 in a first orientation. FIG. 8 is a bottom view of the object 600 and support structure 610 in the first orientation. FIG. 9 is a vertical cross-sectional view of the object 600 and support structure 610 in a second orientation. FIG. 10 is a bottom view of the object 600 and support structure 610 in the second orientation. In FIGS. 7-10, the recoater direction 134 is from right to left. In FIGS. 7 and 9, the build direction 138 is from the bottom up, while in FIGS. 7 and 9, the build direction is into the page.

The object 600 includes a cavity 606 between two portions of the object 600. The cavity may be an open space in the finished object 600. During fabrication of the object 600, without the support structure 610, the cavity 606 would be filled with unfused powder. The object 600 further includes an opening 604 to the cavity 606. In an aspect, the object 600 also includes a divergent portion 602. The divergent portion 602 extends away from the opening 604. For example, the divergent portion 602 extends in a direction transverse to an axis of the opening 604.

The support structure 610 includes a spine 612 extending between a projection portion 614 and a handle 616. The projection portion 614 has a geometry corresponding to the geometry of a portion of the object 600. In particular, the projection portion 614 corresponds to the surface of the divergent portion 602. During fabrication, the projection portion 614 may provide support to the divergent portion 602 as the recoater 116 (FIG. 1) moves in the recoater direction 134. That is, the projection portion 614 provides non-contact support for the divergent portion 602 by being separated by only a thin layer of powder. As shown in FIG. 7, the projection portion 614 projects away from the spine 612 and the opening 604 to correspond to the surface of the divergent portion 602. The handle 616 extends beneath an underside of the object 600 and may be used as a handle to provide torque during a removal step.

As best seen in FIGS. 8 and 10, the support structure 610 includes rounded edges. In particular, the edges of the spine 612, projection portion 614, and the handle 616 are rounded in a plane orthogonal to the longitudinal axis 646. The rounded edges may have a center at the longitudinal axis 646. The rounded edges facilitate rotation of the support structure 610 about the axis 646 while the support structure 610 is within the cavity 606. For example, the rounded edges of the spine 612 allow the spine to rotate without engaging the surface of the object 600. For example, the rounded edge may contact the surface of the object 600 but slide across the surface as the support structure 610 is rotated. Similarly, the rounded edge of the projection portion 614 allows the projection portion 614 to be rotated without engaging the surface of the divergent portion 602. The example support structure 210 discussed above regarding FIGS. 2-6 may also include rounded edges.

Similar to the support structure 210, the support structure 610 cannot be removed from the object 600 in the first orientation because the projection portion 614 blocks downward movement through the opening 604. For example, as illustrated in FIG. 7, the projection portion 604 is blocked by the divergent portion 602. Additionally, upward movement is also blocked by the top of the object 600. However, the support structure 610 can pass through the opening 604 once the support structure 610 has been rotated approximately 90 degrees about a longitudinal axis 646.

FIGS. 9 and 10 show the support structure 610 after it has been rotated approximately 90 degrees about the longitudinal axis 646 to a second orientation. In the second orientation, the projection portion 614 is aligned with a longer dimension of the opening 604. Once rotated, the operator may move the support structure 610 downwardly until it passes through the opening 604.

In an aspect, the support structures disclosed herein can include one or more connecting supports or contact surfaces that directly connect the support structure to the object. Such connecting supports or contact surfaces are broken when the support structure is rotated. Additionally, powder may remain between the object and the support structure increasing resistance to rotation. Accordingly, a feature such as the handle 616 may be useful for providing additional leverage or torque for rotating the support structure 610.

While FIGS. 2-10 show example geometries in which a support may pass through an outlet of the object after rotating the support structure, any variety of geometries for the support structure and the object may be selected. Generally, the support structure and the object will have corresponding geometries. For example, the support structure is separated from a surface of the object by a small distance, which is filled with powder during fabrication. The support structure provides non-contact support by reducing the volume of powder affected by lateral forces. The powder may be removed from between the object and the support structure before the support structure is rotated to the second orientation. In one aspect, the support structure allows for providing support for objects having a divergent surface. The support structure is particularly useful when the object being built has an aspect ratio (e.g., length/height to width ratio) of 4 or greater. The support structure provides mechanical support against lateral forces due to movement of the recoater 116. Accordingly, the support structure prevents a relatively tall or long object from being knocked over or bent by the lateral forces.

When it becomes necessary to remove the support structure 210/610 from the object 200/600, the operator may apply force to break the support structure free when contact surfaces are present. The support structure may be removed by mechanical procedures such as twisting, breaking, cutting, grinding, filing, or polishing. Additionally, thermal and chemical post processing procedures may be used to finish the object. When no contact surfaces are present and instead powder has been placed between the object and the support structure during manufacturing, the powder can simply be removed by blowing, for example, using pressurized air. The removal of the support structure 210/610 from the object 200/600 may take place immediately upon or during removal of the object from the powder bed. Alternatively, the support structure may be removed after any one of the post-treatment steps. For example, the object 200/600 and support structure 210/610 may be subjected to a post-anneal treatment and/or chemical treatment and then subsequently removed from the object 200/600 and/or build plate.

Although several examples of support structures and objects have been provided, it should be apparent that other objects may be built in accordance with the present disclosure. For example, any object having a downward facing convex surface may be supported by one or more of the disclosed support structures. In an aspect, the disclosed support structures are used to manufacture parts for aircraft. For example, a fuel nozzle similar to the one disclosed in U.S. Pat. No. 9,188,341 may be manufactured using support structures disclosed herein.

In an aspect, multiple supports described above may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application Ser. No. 15/042,019, titled. "METHOD AND CONFORMAL SUPPORTS FOR ADDITIVE MANUFACTURING" and filed Feb. 11, 2016;

U.S. patent application Ser. No. 15/042,024, titled "METHOD AND CONNECTING SUPPORTS FOR ADDITIVE MANUFACTURING" and filed Feb. 11, 2016;

U.S. patent application Ser. No. 15/041,973, titled "METHODS AND SURROUNDING SUPPORTS FOR ADDITIVE MANUFACTURING" and filed Feb. 11, 2016;

U.S. patent application Ser. No. 15/042,001, titled "METHODS AND BREAKABLE SUPPORTS FOR ADDITIVE MANUFACTURING" and filed Feb. 11, 2016;

U.S. patent application Ser. No. 15/041,991, titled "METHODS AND LEADING EDGE SUPPORTS FOR ADDITIVE MANUFACTURING" and filed Feb. 11, 2016; and U.S. patent application Ser. No. 15/041,980, titled "METHOD AND SUPPORTS WITH POWDER REMOVAL PORTS FOR ADDITIVE MANUFACTURING" and filed Feb. 11, 2016.

The disclosure of each of these applications are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface stills provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

In an aspect, multiple supports described above may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal supports. Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object, comprising:
   (a) irradiating a layer of powder in a powder bed to form a fused region;
   (b) providing a subsequent layer of powder over the powder bed by passing a recoater arm over the powder bed from a first side of the powder bed;
   (c) repeating steps (a) and (b) until the object and at least one support structure is formed in the powder bed, wherein the at least one support structure and the object have a first orientation, wherein the object comprises an inner structure and an outer structure, where the inner structure and outer structure defines a cavity therebetween and an outlet, and wherein the at least one support structure is positioned within the cavity;
   (d) rotating the support structure to a second orientation; and
   (e) removing the support structure from the object by passing the support structure through the outlet of the object.

2. The method of claim 1, wherein the support structure is incapable of passing through the outlet in the first orientation prior to rotating the removable support structure to the second orientation.

3. The method of claim 1, wherein the support structure has a geometry that corresponds to a portion of a geometry of the object.

4. The method of claim 1, wherein the support structure comprises a projection that extends into a recessed portion of the object.

5. The method of claim 4, wherein the support structure comprises a leg portion extending from the projection out of the outlet.

6. The method of claim 4, wherein the projection, in the first orientation, extends in a direction from the object to the first side.

7. The method of claim 1, wherein the support structure comprises a projection that extends along a divergent surface of the object.

8. The method of claim 1, wherein the rotating the support structure comprises rotating the support structure about a longitudinal axis of the support structure.

9. The method of claim 8, wherein the support structure includes rounded edges in a plane orthogonal to the longitudinal axis.

10. The method of claim 1, wherein the outer structure of the object comprises a cylindrical shape.

11. A method for fabricating an object, comprising:
    (a) irradiating a layer of powder in a powder bed to form a fused region;
    (b) providing a subsequent layer of powder over the powder bed by passing a recoater arm over the powder bed from a first side of the powder bed;
    (c) repeating steps (a) and (b) until the object and at least one support structure is formed in the powder bed, wherein the at least one support structure and the object have a first orientation, wherein the object comprises a cavity having an outlet, and wherein the at least one support structure is positioned within the cavity, and wherein the object has length/height to width ratio of 4 or greater;
    (d) rotating the support structure to a second orientation; and
    (e) removing the support structure from the object by passing the support structure through the outlet of the object.

12. The method of claim 11, wherein the support structure is incapable of passing through the outlet in the first orientation prior to rotating the removable support structure to the second orientation.

13. The method of claim 11, wherein the support structure has a geometry that corresponds to a portion of a geometry of the object.

14. The method of claim 11, wherein the support structure comprises a projection that extends into a recessed portion of the object.

15. The method of claim 11, wherein the rotating the support structure comprises rotating the support structure about a longitudinal axis of the support structure.

16. A method for fabricating an object, comprising:
(a) irradiating a layer of powder in a powder bed to form a fused region;
(b) providing a subsequent layer of powder over the powder bed by passing a recoater arm over the powder bed from a first side of the powder bed;
(c) repeating steps (a) and (b) until the object and at least one support structure is formed in the powder bed, wherein the at least one support structure and the object have a first orientation, wherein the object comprises a cavity having an outlet, and wherein the at least one support structure is positioned within the cavity;
(d) rotating the support structure to a second orientation, wherein the rotating the support structure comprises rotating the support structure approximately 90 degrees; and
(e) removing the support structure from the object by passing the support structure through the outlet of the object.

17. The method of claim 16, wherein the support structure is incapable of passing through the outlet in the first orientation prior to rotating the removable support structure to the second orientation.

18. The method of claim 16, wherein the support structure has a geometry that corresponds to a portion of a geometry of the object.

19. The method of claim 16, wherein the support structure comprises a projection that extends into a recessed portion of the object.

20. The method of claim 16, wherein the rotating the support structure comprises rotating the support structure about a longitudinal axis of the support structure.

* * * * *